United States Patent [19]

Helle et al.

[11] Patent Number: 4,750,530
[45] Date of Patent: Jun. 14, 1988

[54] BULK MATERIALS LOADING SYSTEM

[75] Inventors: Amiel R. Helle, Delaware, Ohio; Jerry L. Bays, Beckley, W. Va.

[73] Assignee: Reliance Electric Company

[21] Appl. No.: 853,800

[22] Filed: Apr. 18, 1986

[51] Int. Cl.⁴ ............................................. G01G 13/06
[52] U.S. Cl. ........................................ 141/1; 141/128; 177/59; 222/58
[58] Field of Search ............... 141/1, 83, 248, 128; 177/1, 52, 56, 57, 58, 59, 65, 90, 100; 414/21; 222/55, 58, 77, 252

[56] References Cited

U.S. PATENT DOCUMENTS

| | | | |
|---|---|---|---|
| 2,228,595 | 1/1941 | Finch | 141/248 X |
| 2,660,394 | 11/1953 | Skeuse et al. | 177/65 X |
| 3,074,654 | 0/1963 | Guggemos | 241/34 |
| 3,129,779 | 0/1964 | Clements | 177/114 |
| 3,233,873 | 0/1966 | Sackett | 366/151 |
| 3,241,625 | 0/1966 | Soojian | 177/120 |
| 3,252,630 | 5/1966 | Berg | 141/128 X |
| 3,454,170 | 0/1969 | Kleissle | 414/21 |
| 3,494,434 | 0/1970 | Rivers | 177/53 |
| 3,599,666 | 8/1971 | Curtis et al. | 141/128 X |
| 3,679,010 | 0/1972 | Bullivant | 177/16 |
| 3,690,392 | 0/1972 | Smith | 177/59 |
| 3,734,215 | 0/1973 | Smith | 177/59 |
| 3,970,159 | 7/1976 | Hahn | 141/128 X |
| 4,266,691 | 5/1981 | Wolwowicz | 141/128 X |
| 4,337,878 | 0/1982 | Brock | 222/1 |
| 4,579,252 | 4/1986 | Wilson et al. | 177/90 X |

Primary Examiner—Mark J. Thronson

[57] ABSTRACT

A system for loading predetermined amounts of flowable bulk materials, such as a coal, from a storage area into a conveyance such as a railroad car includes a conveyor for transporting material from the storage area. The conveyor is driven by an adjustable speed drive system while a belt scale provides information as to the weight of material on the conveyor. The conveyor delivers material to a surge bin which feeds it alternately to each of a pair weigh bins. The weigh bins are discharged alternately into the conveyance when a predetermined weight of material has been accumulated in the weigh bin. A programmable controller controls the rate of delivery of material to the surge bin, the loading of each weigh bin and the discharging of material into the conveyance to maintain an efficient throughput of material.

4 Claims, 5 Drawing Sheets

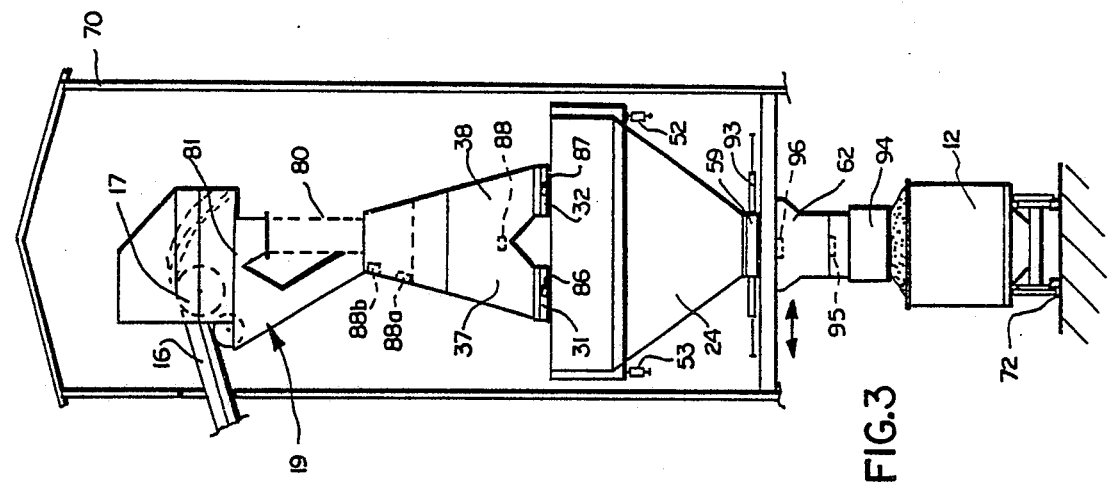
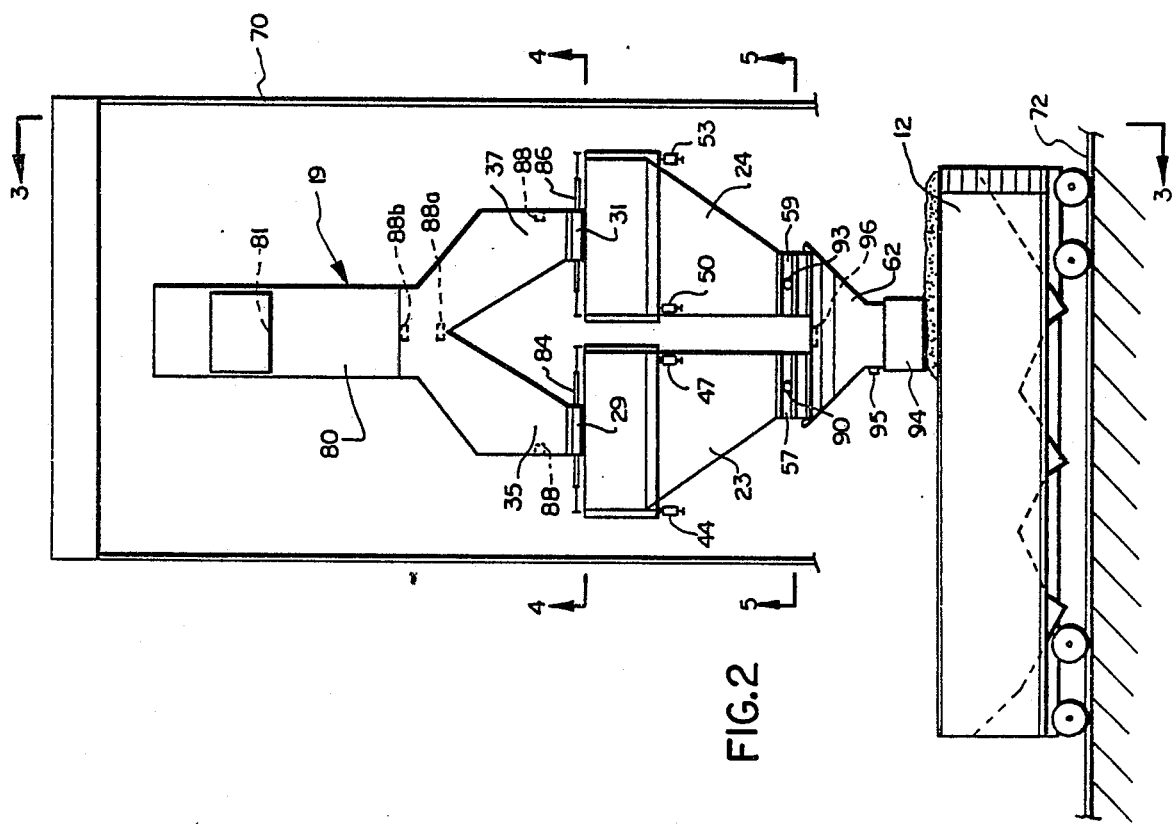

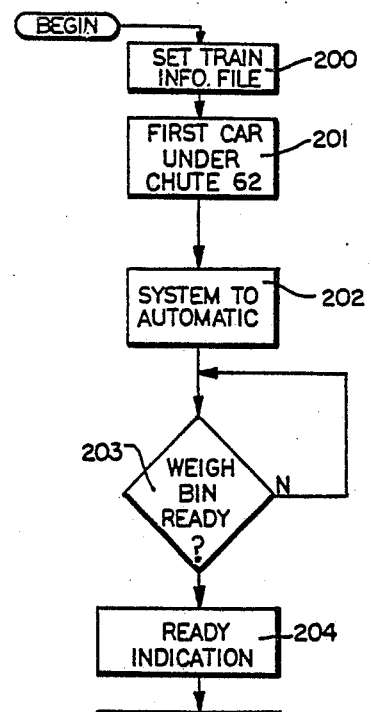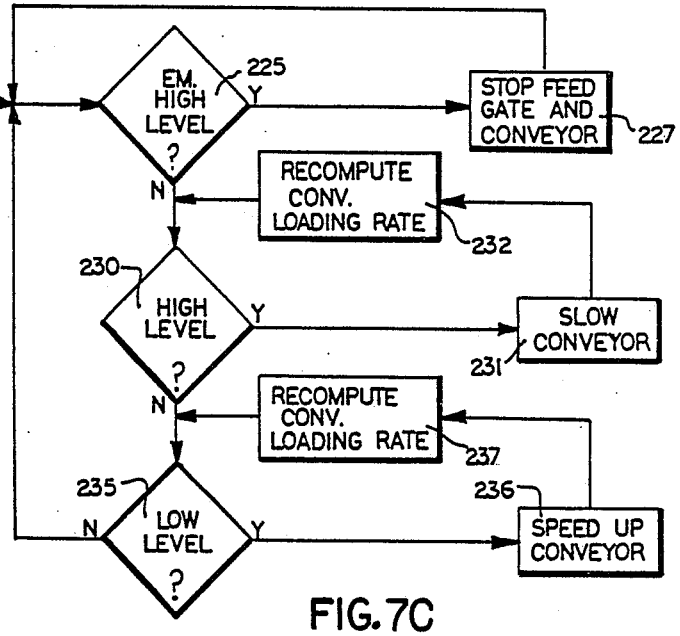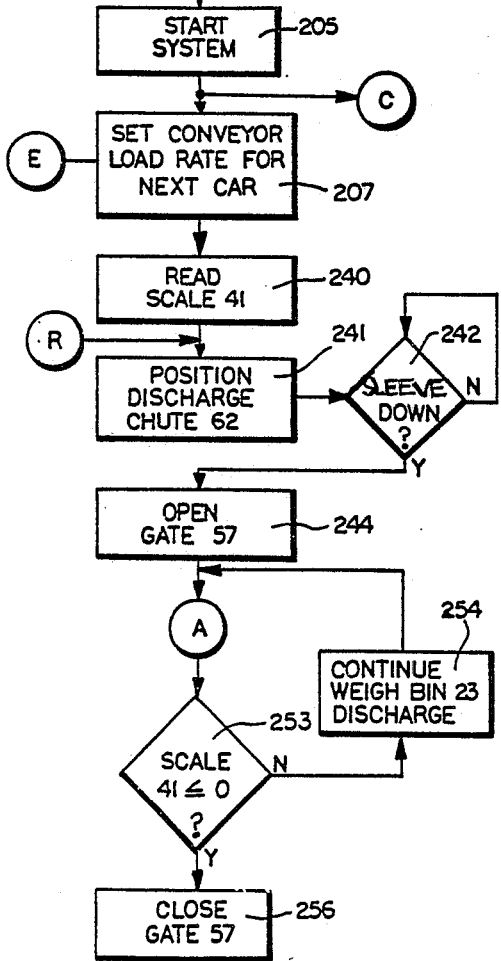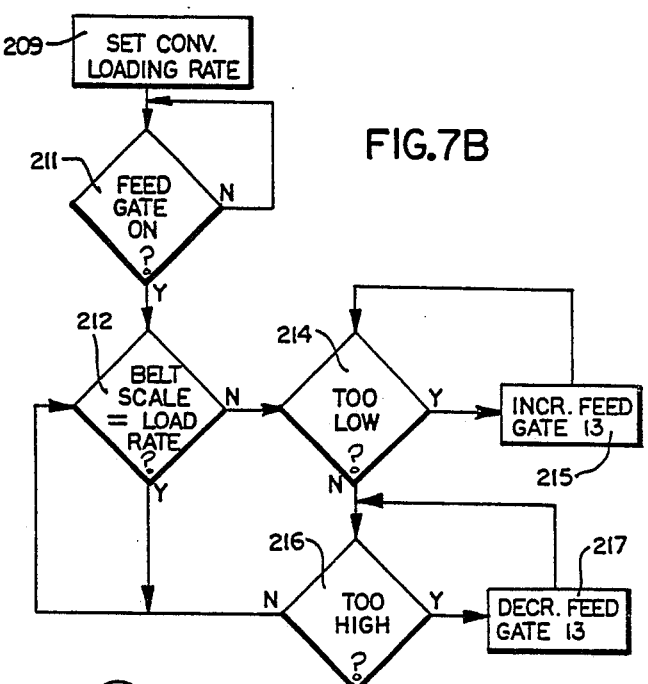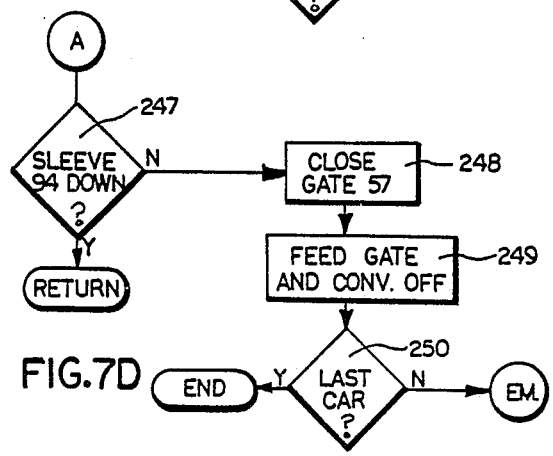
FIG. 7A  FIG. 7B  FIG. 7C  FIG. 7D

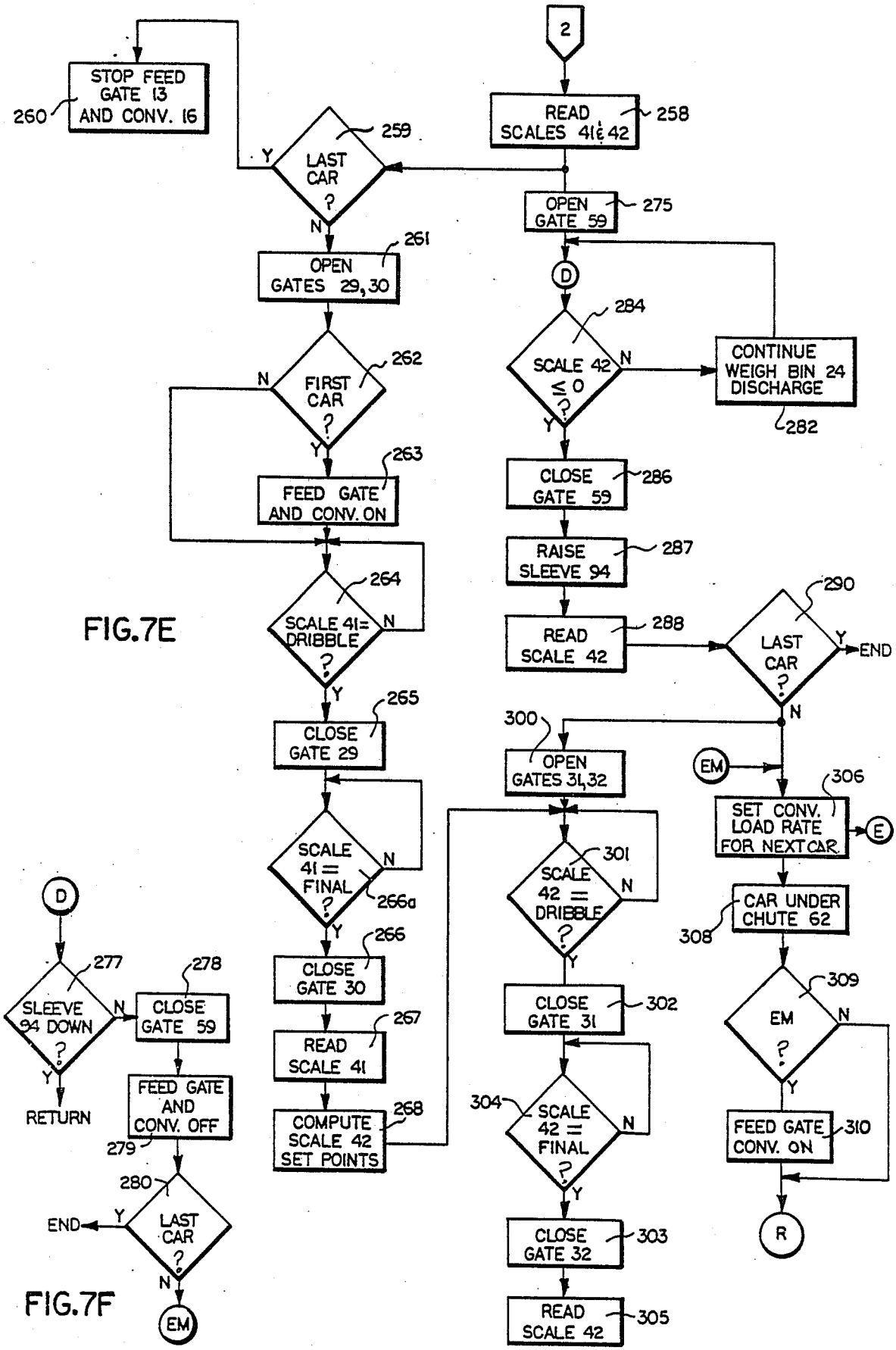

BULK MATERIALS LOADING SYSTEM

BACKGROUND OF THE INVENTION

This invention relates to systems for loading materials in bulk into a conveyance or other receptacle for transport or shipment. More particularly, this invention relates to such a system for loading bulk flowable material, such as coal, that is less expensive to construct and more efficient in operation than prior systems of the same type.

A typical bulk material loading system is that used to load coal or a similar flowable bulk material by weight into a receptacle or into a moving conveyance such as a truck, a railroad car, or other transport means. In such a system, bulk materials from a storage area are loaded onto a belt conveyor by means of variable rate feeders or adjustable slide gates and moved upwardly to the inlet of a series of bins aligned vertically over the conveyance. The loadout rate from the storage area is monitored by one or more belt scales located on the conveyor. The loadout rate is set and adjusted by the variable rate feeders or adjustable slide gates.

The bulk material is discharged from the conveyor into a surge bin of large capacity which acts as an online temporary storage facility. The surge bin is discharged into a single weigh bin where a predetermined weight of material equal to the capacity of the conveyance is accumulated and discharged through a loadout chute into the conveyance. Usually, the conveyance is one of a series of slowly moving trucks or railroad cars or the like. The surge bin is required to have a large capacity to compensate for variations in speed and/or capacity of the conveyances and to handle interruptions in loadout flow and similar circumstances.

The large capacity surge bin is expensive in itself because of its size and also requires that the system be of considerable height because of the necessary height of the surge bin, weigh bin and loadout chute over the conveyances. A lengthy belt conveyor and considerable horsepower are required to lift the bulk materials the required height to the inlet of the surge bin.

SUMMARY OF THE INVENTION

According to the present invention, a bulk material loading system is provided including a pair of weigh bins which are loaded alternately through a relatively small capacity surge bin. One weigh bin is unloaded into the conveyance while the other weigh bin is being loaded. The disadvantages of the large size surge bin are eliminated and a more even flow of material is produced with increased efficiency of the loading apparatus and procedure. Each of the weigh bins may be loaded through the surge bin at a rate very close to the infeed conveyor rate which greatly reduces the needed capacity of the surge bin. The permitted weighing time for each weigh bin is extended which allows for more accurate weighing and more accurate cutoffs of material to the weigh bin without reducing the overall loading rate of the conveyances. Two smaller weigh bins, rather than one large bin, provide greater sensitivity and higher resolution in weighing. Reduction in size of the surge bin reduces the necessary height of the loading structure which reduces the necessary length of the belt conveyor and related structure as well as the energy requirement for lifting the materials to the surge bin inlet.

A system according to the present invention for loading predetermined amounts of flowable bulk materials into a conveyance includes a surge bin having an inlet and multiple outlets and a pair of weigh bins. Each weigh bin has an outlet for discharging material into the conveyance and an inlet communicating with at least one of the surge bin outlets. A flow control gate is provided for each surge bin and weigh bin outlet. Control means is included for controlling the gates to cause a predetermined weight of material to be accumulated alternately in each weigh bin and discharged alternately into the conveyance, one weigh bin being loaded while the other is discharged.

A method according to the present invention for loading predetermined amounts of flowable bulk materials from a storage means into a receptacle includes the steps of supplying material to a surge bin and delivering material from the surge bin to first and second weigh bins alternately until a predetermined weight of material is accumulated in the respective weigh bin, and, while delivering material to one of the weigh bins, unloading the contents of the other weigh bin into the receptacle.

Preferably, material is supplied to the surge bin at a constant rate and discharged therefrom into each weigh bin at greater and lesser rates in successive time periods to maintain a desired average amount of material in the surge bin. The greater and lesser discharge rates may be achieved by having a pair of surge bin outlets communicating with each weigh bin and opening one and then both outlets.

BRIEF DESCRIPTION OF THE DRAWINGS

FIG. 2 is a front elevational view of vertically aligned surge bin, weigh bins and discharge chute in the system of FIG. 1;

FIG. 3 is a left side elevational view of the arrangement shown in FIG. 2;

FIGS. 7A to 7F are flow charts illustrating the operation of a controller for a system according to the present invention.

DESCRIPTION OF A PREFERRED EMBODIMENT

Figure 1:
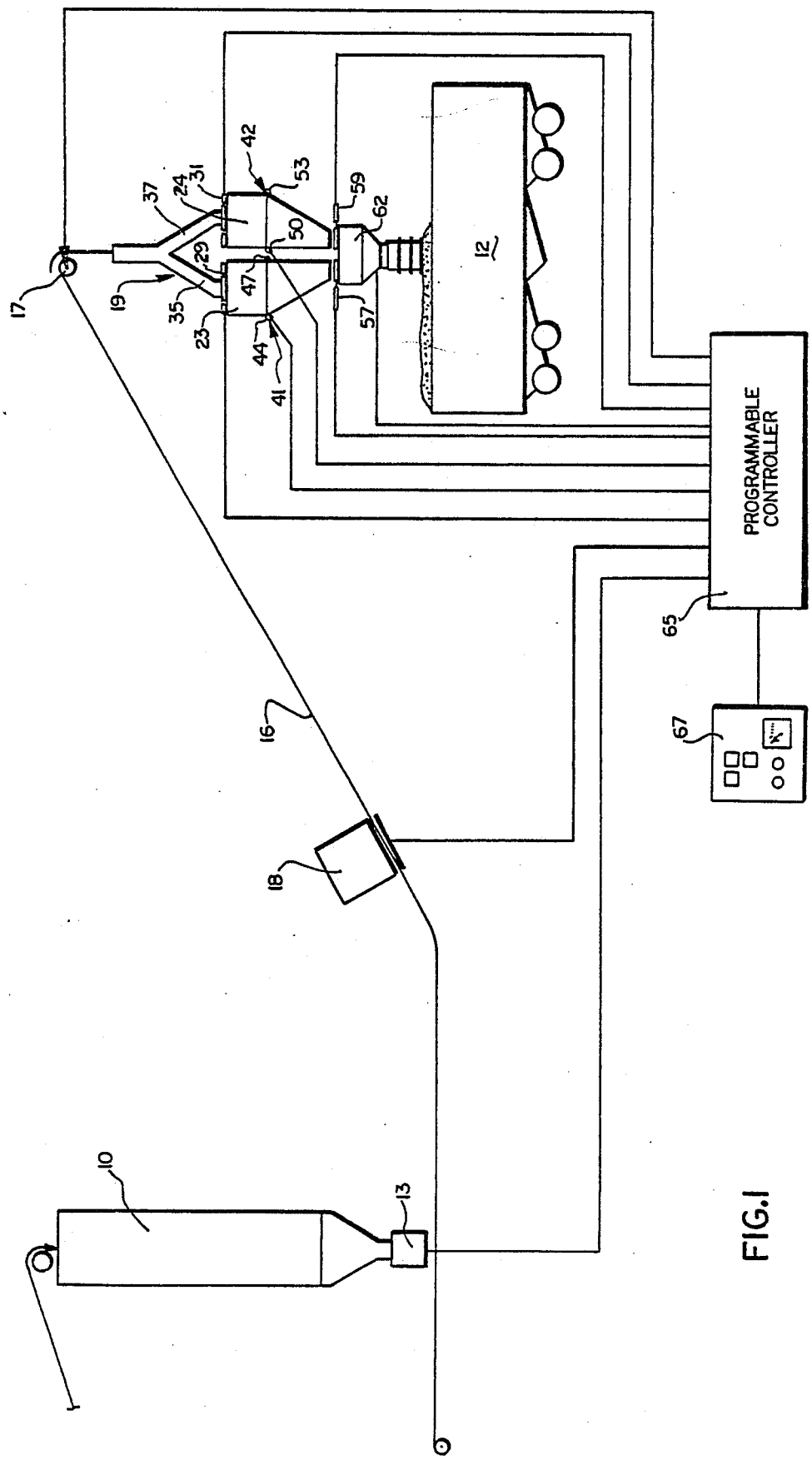
FIG. 1 is a block diagram of a system embodying the present invention for loading predetermined amounts of flowable bulk materials into a conveyance.
Figure 4:
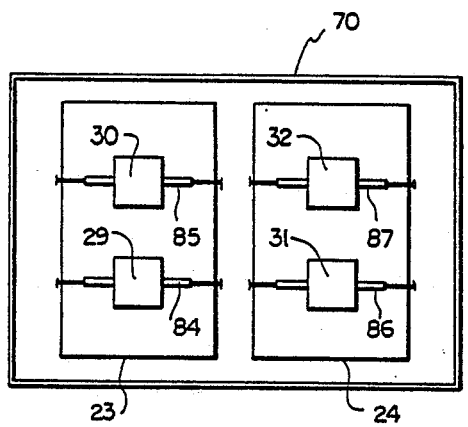
FIG. 4 is a horizontal sectional view along the line 4—4 of FIG. 2.
Figure 5:
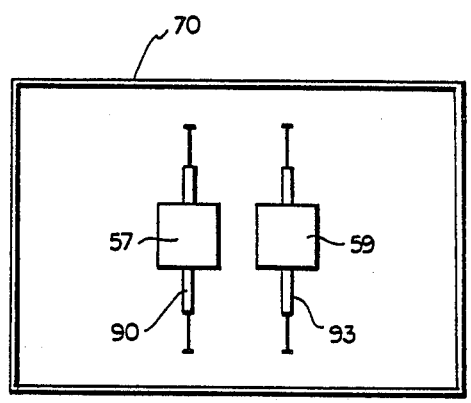
FIG. 5 is a horizontal sectional view along the line 5—5 of FIG. 2.

Referring now to the drawing, there is shown in FIG. 1 a system embodying the present invention for transporting bulk flowable material such as coal from a storage area 10 and loading it into a receptacle or conveyance such as railroad car 12. Railroad car 12 is typically one of a series of slowly moving transport vehicles, all of which are to be loaded by the present system. Material is fed from storage area 10 through a feed gate 13 onto a belt conveyor 16. An adjustable speed drive 17 drives the conveyor at a desired speed. A belt scale 18 provides information as to the weight of material on the conveyor. The material is carried by conveyor 16 to the upper or input end of a surge bin 19. The material is fed in a controlled manner through surge bin 19 alternately into one or the other of a pair of weigh bins 23, 24. Delivery of material through surge bin 19 to weigh bins 23, 24 is controlled by a set of four surge bin gates 29 to 32 each connected to one of four legs 35 to 39 of the surge bin. Material is fed through gates 29 and 30 from legs 35 and 36 to weigh bin 23 and through gates 31 and 32 from legs 37 and 38 to weigh bin 24. The rate of delivery of material into each weigh bin 23, 24 is determined by the open or closed position of one or both of the surge bin gates leading to it.

Each weigh bin 23, 24 is supported by a scale 41, 42, respectively, including a load cell at each corner of the weigh bin identified by the numerals 44 to 47 for weigh bin 23 and 50 to 53 for weigh bin 24. Preferably, these load cells are those manufactured by Toledo Scale Division of Reliance Electric Company and sold under the trademark "Cap Check" model 934. The scales 41, 42 provide a continuous indication of the weight of material in each weigh bin. Material is discharged from weigh bins 23, 24 through a gate 57 for weigh bin 23 and a gate 59 for weigh bin 24 and through a single discharge chute 62 into car 12.

The loading system of FIG. 1 operates under control of a programmable controller 65 which receives weight data from conveyor belt scale 18 and the weigh bin scales 41 and 42. Controller 65 provides commands to feed gate 13, adjustable speed drive 17, surge bin gates 29 to 32 and discharge gates 57 and 59 to control the delivery of material from storage area 10 to railroad car 12 so that the proper weight of material will be delivered to each car 12 as it moves beneath discharge chute 62. A control console 67 is connected to programmable controller 65 to enable an operator to provide needed information to controller 65 and to receive data therefrom. Data and commands are transmitted between programmable controller 65 and the various control and data devices through appropriate interfaces of conventional design such as analog-to-digital and digital-to-analog-converters (not shown). Such devices are well known to those skilled in the art and need not be described here.

Feed gate 13 operates under control of programmable controller 65 to determine the rate of delivery of material from storage area 10 to conveyor 16 and may be of any conventional design. Belt scale 18 provides continuous information as to the weight of material on conveyor 16 to programmable controller 65 and is preferably a model 8172 belt scale sold by the Toledo Scale Division of Reliance Electric Company. Adjustable speed drive 17 moves conveyor belt 16 at the speed commanded by programmable controller 65. Drive 17 is preferably a conveyor drive manufactured by the Dodge Division of Reliance Electric Company and sold under the trademark "Dodge CST". Weigh bin scales 41 and 42 provide programmable controller 65 with information as to the weight of material in the respective bins 23, 24. The information provided by the various devices along with information as to the desired weight of material to be loaded into each car 12 and the rate of movement of each car permits programmable controller 65 to control the system so that material is delivered to car 12 at the proper rate. Programmable controller 65 is preferably an "Automate" 30 programmable controller manufactured by Reliance Electric Company.

Referring now to FIGS. 2 to 5, surge bin 19, weigh bins 23 and 24 and discharge chute 62 are supported in vertical alignment within a housing 70 above a track 72 along which railroad cars 12 are moved beneath discharge chute 62. Adjustable speed drive 17 is mounted within housing 70 above the inlet of surge bin 19. Conveyor belt 16 delivers material to the inlet at the upper end of surge bin 19 for controlled passage vertically downward through surge bin 19, weigh bins 23 and 24 and discharge chute 62 into passing railroad cars 12.

Surge bin 19 includes a substantially vertical upper body 80 with an inlet 81 at its upper end and legs 35 to 38 all of which communicate with upper body 80 The lower outlet end of each leg 35 to 38 is closed by gates 29 to 32 operated by hydraulic cylinder arrangements 84 to 87, respectively. The outlet ends of legs 35 and 36 are positioned above weigh bin 23 and the outlet ends of legs 37 and 38 are positioned above weigh bin 24. A set of level sensors 88, 88a, 88b are provided at different positions in surge bin 19 to provide indications of low, high and "emergency" high levels, respectively, of material in the surge bin. These sensors are used in controlling the delivery of material to surge bin 19. Two low level sensors 88 are mounted on the walls of the surge bin, one to sense a low level of material in legs 35 and 36 and the other to sense a low level of material in legs 37 and 38. High level sensor 88b and emergency high level sensor 88c are mounted at higher levels in surge bin 19 as shown in FIGS. 2 and 3.

Weigh bin 23 is supported by weighing scale 41 including load cells 44 to 47 and weigh bin 24 is supported by identical weighing scale 42 including load cells 50 to 53. The lower or outlet end of weigh bin 23 is closed by a gate 57 operated by a hydraulic cylinder arrangement 90. The outlet end of weigh bin 24 is similarly closed by a gate 59 operated by an identical hydraulic cylinder arrangement 93. The outlet end of each weigh bin is positioned above the inlet of discharge chute 62 through which material is delivered to cars 12. The lower end of discharge chute 62 includes a retractable sleeve 94 that telescopes over the upper portion as indicated in FIGS. 2 and 3. The chute is also movable horizontally into and out of the path of a railroad car. The discharge chute is operated through a hydraulic system by an operator who positions the chute for approaching railroad cars. Sensors 95 and 96 of the discharge chute indicate to programmable controller 65 the positions of the sleeve and discharge chute.

Figure 6:
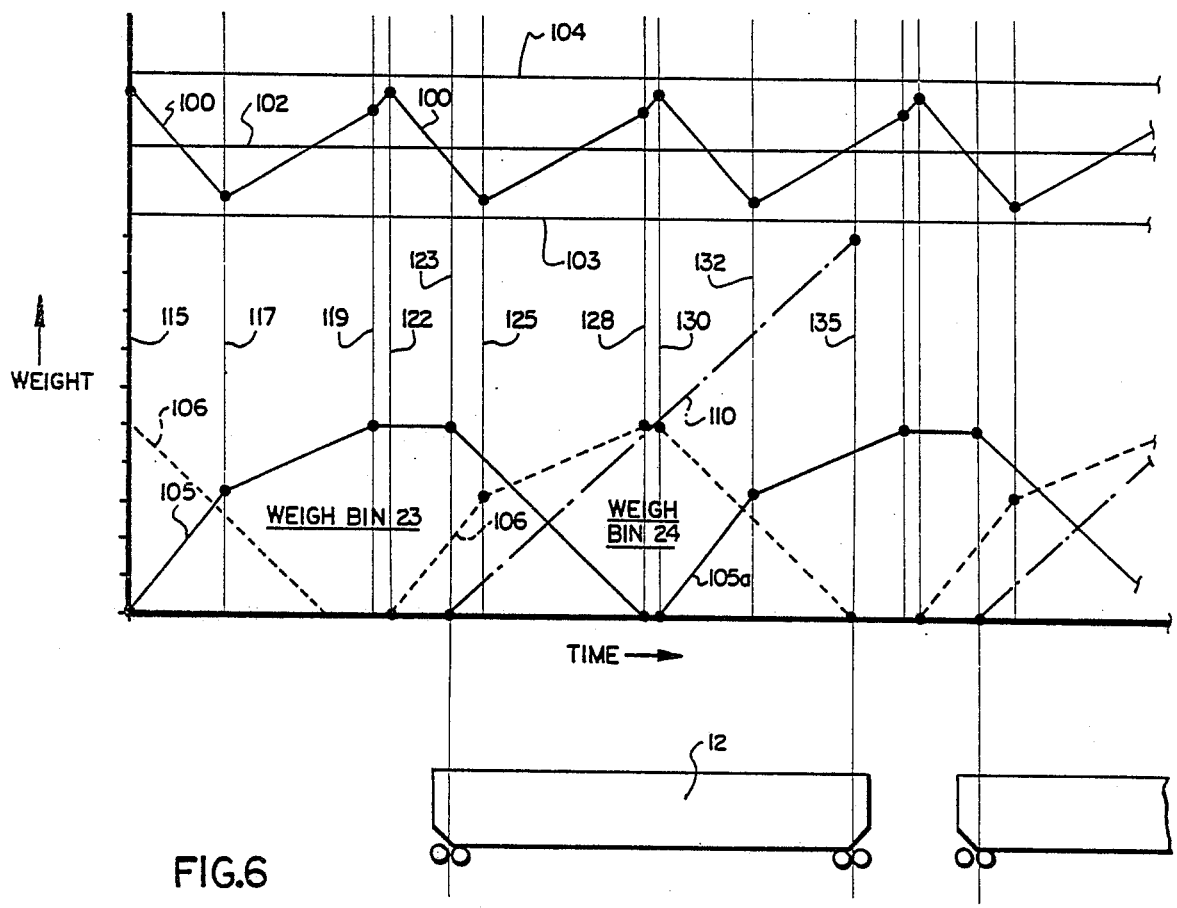
FIG. 6 is a diagram illustrating the variation in the weight of material in the surge bin, weigh bins and conveyance as a function of time.

FIG. 6 illustrates the normal operation of the system. Curve 100 in FIG. 6 represents the variation with time in the weight of material in surge bin 19 and line 102 represents the average weight of material in the surge bin. Lines 103 and 104 represent the low and high levels of material in surge bin 19 as indicated by sensors 88, 88a. Material is supplied to the surge bin 19 by conveyor belt 16 at an adjustable rate. The lower set of curves 105, 106 represent the variation in the weight of material over time in weigh bin 23 and weigh bin 24, respectively. Curve 110 represents the weight of material loaded into car 12 as a function of time.

Immediately prior to point 115 gates 29 to 32 in the legs of surge bin 19 are closed as are gates 57 and 59 at the outlet ends of weigh bins 23 and 24. Material supplied over conveyor 16 to surge bin 19 has accumulated in the surge bin to the weight level indicated by curve 100 at point 115. Weigh bin 23 is empty and weigh bin 24 is full. At point 115 gate 59 is opened and material is discharged from weigh bin 24 into a preceding railroad car 12 (not shown) as indicated by curve 106. Also, gates 29 and 30 in legs 35 and 36 of surge bin 19 are opened to cause a net outflow of material from surge bin 19 into weigh bin 23 as represented by curves 100 and 105. When weigh bin 23 has accumulated a predetermined weight of material at point 117 gate 29 is closed so that material is then delivered from surge bin 19 into weigh bin 23 at a reduced or "dribble" rate. The weight of material in surge bin 19 then increases as the constant rate of material inflow to the surge bin is greater than the rate of outflow through gate 30 alone. Weigh bin 23 continues to be loaded with material but at the lower "dribble" rate indicated by curve 105.

At point 119, the material in weigh bin 23 has accumulated to a predetermined weight and gate 30 is closed. A constant weight of material is maintained in weigh bin 23 and material is accumulated in surge bin 19 at an increased rate to point 122 where the weight of material in the surge bin is equal to that at point 115. Gates 31 and 32 in legs 37 and 38 of surge bin 19 are opened at point 122 so that material is loaded into weigh bin 24 at the rate indicated by curve 106 and removed from surge bin 19 at the rate indicated by curve 100. At point 123 gate 57 at the outlet end of weigh bin 23 is opened and the contents of the weigh bin are delivered through discharge chute 62 at the rate indicated by curve 105 and accumulated in railroad car 12 at the rate indicated by curve 110. Gate 31 in leg 37 of surge bin 19 is closed at point 125 when a predetermined weight of material has been accumulated in weigh bin 24. Material continues to be accumulated in weigh bin 24 but at the reduced "dribble" rate indicated by curve 106 and the weight of material in surge bin 19 increases as indicated by curve 100. Gate 32 in leg 38 of surge bin 19 is closed at point 128 when a predetermined weight of material has been accumulated in weigh bin 24. The weight of material in weigh bin 24 is maintained constant while material is accumulated in surge bin 19 at an increased rate. Also at point 128 the entire contents of weigh bin 23 have been delivered to railroad car 12. When zero net weight is detected in weigh bin 23 gate 57 is closed. At point 130, gate 59 at the outlet end of weigh bin 24 is opened and the contents of the weigh bin are delivered through discharge chute 62 to car 12 at the rate indicated by curve 106. The material continues to be accumulated in railroad car 12 at the rate indicated by curve 110, but from weigh bin 24 instead of weigh bin 23.

Also at point 130, gates 29 and 30 in legs 35 and 36 of surge bin 19 are again opened to cause material to be accumulated in weigh bin 23 at the rate indicated in curve 105a, the second cycle of curve 105. The weight of material in surge bin 19 again decreases at the rate indicated by curve 100. Gate 29 in leg 35 of surge bin 19 is again closed at point 132 so that weigh bin 23 is filled at a reduced rate indicated by curve 105 and material is accumulated in surge bin 19 at the rate indicated by curve 100. At point 135, all the material from weigh bin 24 has been delivered to railroad car 12. Gate 59 at the outlet of weigh bin 24 is closed upon detection of zero net weight in the weigh bin.

Operation continues in the manner described above for each of the succeeding railroad cars. Surge bin 19 is provided with material at an adjustable rate to maintain the level between the low and high levels sensed by level sensors 88, 88a. Each weigh bin 23, 24 is filled at two different rates and emptied at a constant rate alternately into each railroad car in the series to be loaded. One or more of the railroad cars may have greater or lesser capacity than the others or be intended to receive a greater or lesser quantity of material. In that case, weigh bins 23 and 24 will be loaded and discharged at the same rates for longer or shorter time periods. Feed gate 13 and conveyor 16 will be adjusted to maintain the level of material in surge bin 19 between the high and low levels.

The programmed operation of controller 65 in implementing the loading procedure described above is illustrated in the flow charts of FIGS. 7A to 7F.

Prior to programmed operation the operator performs a manual system preparation and calibration. This manual system preparation and calibration results in both weigh bins 23 and 24 being loaded with the proper amounts of material to be discharged into the first car of an approaching series. Neither feed gate 13 nor conveyor 16 are operating at the end of the calibration procedure but material is accumulated in surge bin 19 and on conveyor 16.

As shown in FIG. 7A, at block 200 information regarding the approaching train, including the amount of material to be loaded into each car, is entered into programmable controller 65. At block 201 the first car is positioned under discharge chute 62 and at block 202 the system is switched to automatic mode. If weigh bins 23 and 24 are determined to be loaded at block 203 the ready light is received at block 204 and a system start button may be operated at block 205. At block 207 the rate at which feed gate 13 is to load material onto conveyor 16 for the second car in the series is set into a register 209 (FIG. 7B).

FIG. 7B shows a continuously operating routine for setting and maintaining the rate at which material is fed by feed gate 13 onto conveyor 16. Whenever feed gate 13 is operating as determined at block 211, the programmed loading rate from block 209 is compared at block 212 to information received from belt scale 18. If the loading rate is too low as determined at block 214 feed gate 13 is adjusted at block 215 to increase the feed rate. If the loading rate is too high as determined at block 216 the feed rate is decreased at block 217 until belt scale 18 indicates the desired weight rate of material on conveyor 16.

FIG. 7C shows another routine that operates continuously once started by a system start command at block 205. This routine is for controlling conveyor 16 in response to an indication of low, high or emergency high levels of material in surge bin 19. If an emergency high level indication from sensor 88b is received at block 225 both feed gate 13 and conveyor 16 are stopped at block 227 until the emergency high level indication is no longer received. If a high level indication from sensor 88a is received at block 230 conveyor 16 is slowed at block 231 and the proper conveyor 16 loading rate is recalculated at block 232 to take the conveyor speed change into account. If a low level indication from either sensor 88 is received at block 235 the speed of conveyor 16 is increased at block 236 and the conveyor loading rate is also recalculated at block 237. This continuously operating routine insures that appropriate action is taken if the level of material in surge bin 19 becomes excessively low or excessively high.

Returning to the main program in FIG. 7A, at block 240 scale 41 for weigh bin 23 is again read and at block 241 the operator lowers sleeve 94 of discharge chute 62. When sleeve 94 is indicated as being down at block 242 discharge gate 57 is opened at block 244 to allow the contents of weigh bin 23 to be discharged into the first car 12. Programmed operation then proceeds to routine A in FIG. 7D. If sleeve 94 of discharge chute 62 is raised as determined at block 247 discharge gate 57 is closed at block 248 and feed gate 13 and conveyor 16 are turned off at block 249. If the car being loaded is not the last car to be loaded as determined at block 250, operation jumps to point EM (FIG. 7E) bypassing any further attempt at loading the particular railroad car. If the car being loaded is determined at block 250 to be the last car to be loaded operation is ended.

If, in FIG. 7D, sleeve 94 of discharge chute 62 is down operation returns to the main program in FIG. 7A. Scale 41 of weigh bin 23 is read at block 253 to determine if the weigh bin is yet discharged to zero weight. If not, weigh bin 23 continues discharging at block 254. Operation continues around this loop until weigh bin 23 has been emptied and then gate 57 is closed at block 256. Operation proceeds to FIG. 7E.

At block 258, scales 41 and 42 of weigh bins 23 and 24 are again read. If it is determined at block 259 that the car being loaded is the last car to be loaded feed gate 13 and conveyor 16 are stopped at block 260. If not the last car, operation is started to begin loading weigh bin 23 for discharge into the next car. At block 261 weigh gates 29 and 30 are both opened. If at block 262 the car being loaded is determined to be the first car feed gate 13 and conveyor 16 are turned on at block 263. If not the first car, block 263 is bypassed because the feed gate and conveyor are on. When the weight of material in weigh bin 23 has reached the predetermined "dribble" weight (point 117, FIG. 6) as determined at block 264, weigh gate 29 is closed at block 265 and material is provided only through weigh gate 30 at the lower "dribble" rate. Gate 30 is closed at block 266 when the weight of material in weigh bin 23 has reached the final target weight as determined at block 266a. Scale 41 is then read at block 267 to determine the actual weight of material in weigh bin 23. At block 268 the set points for loading weigh bin 24 are calculated so that any overloading or underloading of weigh bin 23 can be taken into account when loading weigh bin 24 to provide the correct weight of material into the next railroad car.

At the same time that weigh bin 23 is being loaded weigh bin 24 is being discharged into car 12. At block 275 gate 59 is opened to permit the contents of weigh bin 24 to be discharged into car 12. The discharge operation proceeds around a loop similar to that for the discharging of weigh bin 23. A routine entered at point D and shown in FIG. 7F monitors sleeve 94 of discharge chute 62. If sleeve 94 is raised at block 277 gate 59 is closed at block 278 and feed gate 13 and conveyor 16 are turned off at block 279. If the car being loaded is the last car in the series as determined at block 280 operation is ended. If not the last car, operation jumps to point EM bypassing any further discharge of material from weigh bin 24 into the car. So long as sleeve 94 of discharge chute 62 is not raised weigh bin 24 continues discharging into the car as shown at block 282 until the weigh bin is empty as indicated by the reading of scale 42 at block 284. Discharge gate 59 is then closed at block 286, the operator raises sleeve 94 at block 287 and scale 42 is read at block 288 to obtain a no-load weight for weigh bin 24. If the car is determined at block 290 to be the last car operation is ended, feed gate 13 and conveyor 16 having been turned off at block 260. If another car is to be loaded operation continues to reload weigh bin 24 and to discharge the contents of weigh bin 23 into the next car in the series.

Reloading of weigh bin 24 is begun by opening gates 31 and 32 at block 300. The target weights for weigh bin 24 may be adjusted according to information from block 268 which takes into account the actual weight of material in weigh bin 23 so that any small overload or underload can be compensated in weigh bin 24. When weigh bin 24 has been filled to the "dribble" weight (represented in FIG. 6 by point 125 on curve 106) as determined at block 301, gate 31 is closed at block 302 and loading continues through only gate 32 at the lower "dribble" rate. Gate 32 is closed at block 303 when the weigh bin has reached the final target weight at block 304. A final weight indication from scale 42 is read at block 305.

While weigh bin 24 is being reloaded for discharge into the upcoming car, operation also proceeds at block 306 where the loading rate of conveyor 16 through feed gate 13 is set for the next car after the upcoming car. When the upcoming car is under discharge chute 62 as determined at block 308 a check is made at block 309 to determine if an emergency shut-off and jump to point EM had taken place during loading of the prevous car. If so, feed gate 13 and conveyor 16 are restarted at block 310. If not, block 310 is bypassed.

Operation then returns to entry point R in FIG. 7A and the sequence of operation is repeated continually until the last car has been filled.

What is claimed is:

1. A system for loading predetermined amounts of flowable bulk material continuously from a storage means into a single moving receptacle comprising a surge bin, first and second weigh bins, means for supplying material from said storage means to said surge bin at a constant predetermined rate, means for discharging material from said first weigh bin to said receptacle while delivering material from said surge bin to only said second weigh bin at a first rate higher than said predetermined rate and then at a second rate lower than said predetermined rate until a predetermined weight of material is accumulated in said second weigh bin, and means for discharging material from said second weigh bin into said receptacle while delivering material from said surge bin to only said first weigh bin at said first rate and then at said second rate until a predetermined weight of material is accumulated in said first weigh bin.

2. A system as claimed in claim 1 wherein said surge bin has a pair of outlets communicating with each weigh bin, both of said outlets being gated open to provide said first rate and one of said outlets being gated closed to provide said second rate.

3. A method of loading predetermined amounts of flowable bulk material continuously from a storage means into a single moving receptacle,
said method comprising the steps of supplying material from said storage means to a surge bin at a constant predetermined rate, discharging material from a first weigh bin to said receptacle while delivering material from said surge bin to only a second weigh bin at a first rate higher than said predetermined rate and then at a second rate lower than said predetermined rate until a predetermined weight of material is accumulated in said second weigh bin, and discharging material from said second weigh bin into said receptacle while delivering material from said surge bin to only said first weigh bin at said first rate and then at said second rate until a predetermined weight of material is accumulated in said first weigh bin.

4. A method as claimed in claim 3 wherein said surge bin has multiple outlets and material is delivered from different ones of said outlets to said first and second weigh bins, respectively.

* * * * *